(12) United States Patent
Lichtenwalter

(10) Patent No.: US 10,041,454 B1
(45) Date of Patent: Aug. 7, 2018

(54) DISRUPTIVE AIR FLOW ASSEMBLY FOR A VEHICLE ENGINE

(71) Applicant: Disruption Performance LLC, Staten Island, NY (US)

(72) Inventor: Eric M. Lichtenwalter, San Jose, CA (US)

(73) Assignee: Disruption Performance LLC, Staten Island, NY (US)

( * ) Notice: Subject to any disclaimer, the term of this patent is extended or adjusted under 35 U.S.C. 154(b) by 0 days.

(21) Appl. No.: 15/295,590

(22) Filed: Oct. 17, 2016

(51) Int. Cl.
*F02D 9/00* (2006.01)
*F02M 35/10* (2006.01)
*F02M 35/12* (2006.01)

(52) U.S. Cl.
CPC .. *F02M 35/10262* (2013.01); *F02M 35/1222* (2013.01)

(58) Field of Classification Search
CPC ............... F02M 35/10262; F02M 35/1222
USPC ............... 123/389, 399, 400, 401, 184.53
See application file for complete search history.

(56) References Cited

U.S. PATENT DOCUMENTS

| | | | | |
|---|---|---|---|---|
| 3,381,771 A | * | 5/1968 | Granger | B60K 31/102 123/352 |
| 3,485,316 A | * | 12/1969 | Howard | B60K 31/105 123/352 |
| 3,659,499 A | * | 5/1972 | Woodward | F02D 11/08 123/396 |
| 4,240,145 A | * | 12/1980 | Yano | F02D 31/005 123/585 |
| 4,366,790 A | * | 1/1983 | DeBoynton | F02D 31/005 123/198 DB |
| 4,393,838 A | * | 7/1983 | Muscatell | F02M 7/20 123/435 |
| 4,466,398 A | * | 8/1984 | Nakanishi | F02F 1/4228 123/188.14 |
| 4,541,378 A | * | 9/1985 | Kitamura | F02D 11/107 123/397 |
| 5,823,157 A | * | 10/1998 | Muramatsu | F02B 27/02 123/184.53 |
| 6,691,665 B2 | | 2/2004 | Gray et al. | |
| 7,353,791 B2 | | 4/2008 | Sasaki et al. | |
| 7,357,220 B2 | | 4/2008 | Horikou | |
| 9,097,222 B2 | | 8/2015 | Cho | |
| 2007/0175683 A1 | | 8/2007 | Miyake et al. | |
| 2013/0199487 A1 | | 8/2013 | Bernard | |
| 2015/0354417 A1 | | 12/2015 | Yun et al. | |

FOREIGN PATENT DOCUMENTS

DE    102007026416    12/2008

* cited by examiner

*Primary Examiner* — Hai Huynh
(74) *Attorney, Agent, or Firm* — Middleton Reutlinger

(57) ABSTRACT

Present embodiments provide a disruptive air flow assembly which connects to a vacuum line and utilizes a valve to open and close and thereby vary the vacuum pressure in the vacuum line. This affects air flow into the engine which is utilized for combustion and therefore causes the engine to vary the engine sound by running roughly at a preselected engine speed. A vacuum fitting may house the valve to vary air flow by opening and closing inlets in the fitting. A motor may be utilized to move the valve between the open and closed positions.

19 Claims, 6 Drawing Sheets

DISRUPTIVE AIR FLOW ASSEMBLY FOR A VEHICLE ENGINE

CROSS REFERENCE TO RELATED APPLICATION

None.

BACKGROUND

1. Field of the Invention

The present disclosure relates to vehicle engines. More particularly, the present disclosure relates to a disruptive air flow assembly which may variably disrupt air flow to a vehicle engine in order to change the sound of the engine at a preselected engine speed.

2. Description of the Related Art

In creating hot rod or high performance vehicles, engine modifications are common. One desirable modification involves changing the cam shaft and cams of a vehicle engine in order to provide a higher performance at higher RPMs. The result of such modification may be in a lopey, irregular sound from the engine at idle speeds where efficiency is not of a higher concern. However, in certain communities such loud, irregular sound is desirable and signifies to others that the engine has been modified.

In order to perform such work, one generally should be highly skilled in performing engine maintenance and/or modifications. Many people are not skilled in such manner that they can work perform such work. Thus, while the parts for the work may be expensive, often times the labor costs may be as much or more than the parts due to the technical nature of the work being performed.

Further, many people cannot afford cars with large engines that are more commonly known to be suitable for modification. As a result, less expensive vehicles have become popular for modification or tuning.

It would be desirable to provide an assembly which provides the same or similar effect as a cam change but also provide such at a lower cost to vehicle owners.

It would also be desirable to provide such sound effect which does not negatively impact normal operation and performance of the engine. It would also be desirable to vary the sound made by the engine to a desired amount.

It would also be desirable to provide these features which may be more easily installed at a lesser cost to vehicle owners.

The information included in this Background section of the specification, including any references cited herein and any description or discussion thereof, is included for technical reference purposes only and is not to be regarded subject matter by which the scope of the invention is to be bound.

SUMMARY

Present embodiments provide a disruptive air flow assembly which connects to a vacuum line and utilizes a valve to open and close and thereby vary the vacuum pressure in the vacuum line. This affects air flow into the engine which is utilized for combustion and therefore causes the engine to vary the engine sound by running roughly at a preselected engine speed. A vacuum fitting may house the valve to vary air flow by opening and closing inlets in the fitting. A motor may be utilized to move the valve between the open and closed positions.

According to some embodiments, a disruptive air flow assembly for a vehicle engine comprises a vacuum line fitting having a valve, the vacuum line fitting having a fluid connection and at least one aperture extending through the vacuum line fitting and to the fluid connection. An inlet is formed at the aperture and an outlet formed at the fluid connection defining a flow path through the vacuum line fitting. A motor is operably connected to the valve to move the valve and vary air flow in the flow path. A processor may be in electrical communication with a potentiometer, the processor further in electrical communication with the motor, wherein the potentiometer may be adjusted to vary a speed of the motor and vary a speed of the valve to disrupt air flow passing through the vacuum line fitting.

Optionally, the at least one aperture being multiple apertures spaced about the fitting. The valve may allow, stop and varying air flow through the apertures. The processor may be a microprocessor. The disruptive air flow assembly may further comprise a switch in communication with the processor. The disruptive air flow assembly wherein the switch one of inhibits or allows operation of the motor. The switch may be capable of being connected to a throttle.

According to some embodiments, a method of changing engine sound comprises the steps of bringing an engine to idle speed, moving a motor in electrical communication with a potentiometer and a power source, moving a valve by the motor to actuate between a first and second position, allowing air flow to pass through an aperture in a vacuum line fitting when the valve is in an open position and, varying a sound of the engine by adjusting said potentiometer.

Optionally, the method may further comprise adjusting a potentiometer to a desired motor speed. The motor speed may change the rate of valve movement. The method of disrupting air flow to a vehicle engine further comprising disengaging the motor when the engine speed raises above idle. The method of disrupting air flow to a vehicle engine further comprising actuating a switch to disengage the motor from operating. The method of disrupting air flow to a vehicle engine further comprising actuating the switch with movement of a throttle component.

According to still further embodiments, a vehicle with a disruptive air flow assembly, comprises an engine which mixes air and fuel to produce a mechanical work, a vacuum line fitting in air flow communication with the engine, the vacuum line fitting having a location for vacuum line connection and at least one hole disposed into the fitting, a valve disposed in the fitting and movable between a first position and a second position wherein the at least one aperture is one of open or closed at one of said first position or said second position to air flow through said fitting. A processor may receive input from a potentiometer in electrical communication with the processor, and, a motor in electrical communication with the processor, the motor operably engaging the valve to move the valve between the first and second positions based upon an input from the potentiometer.

Optionally, the vehicle with the disruptive air flow assembly may further comprise a switch in operable communication with the engine to one of operate or preclude operation of the disruptive air flow assembly. The switch may be operably connected to a throttle. The potentiometer may be disposed in an interior of the vehicle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a disruptive air flow assembly will now be described by way of examples. These embodiments are not to limit the scope of the claims as other embodiments of the disruptive air flow assembly will become apparent to one having ordinary skill in the art upon reading the instant description. Non-limiting examples of the present embodiments are shown in figures wherein:

DETAILED DESCRIPTION

Figure 1:
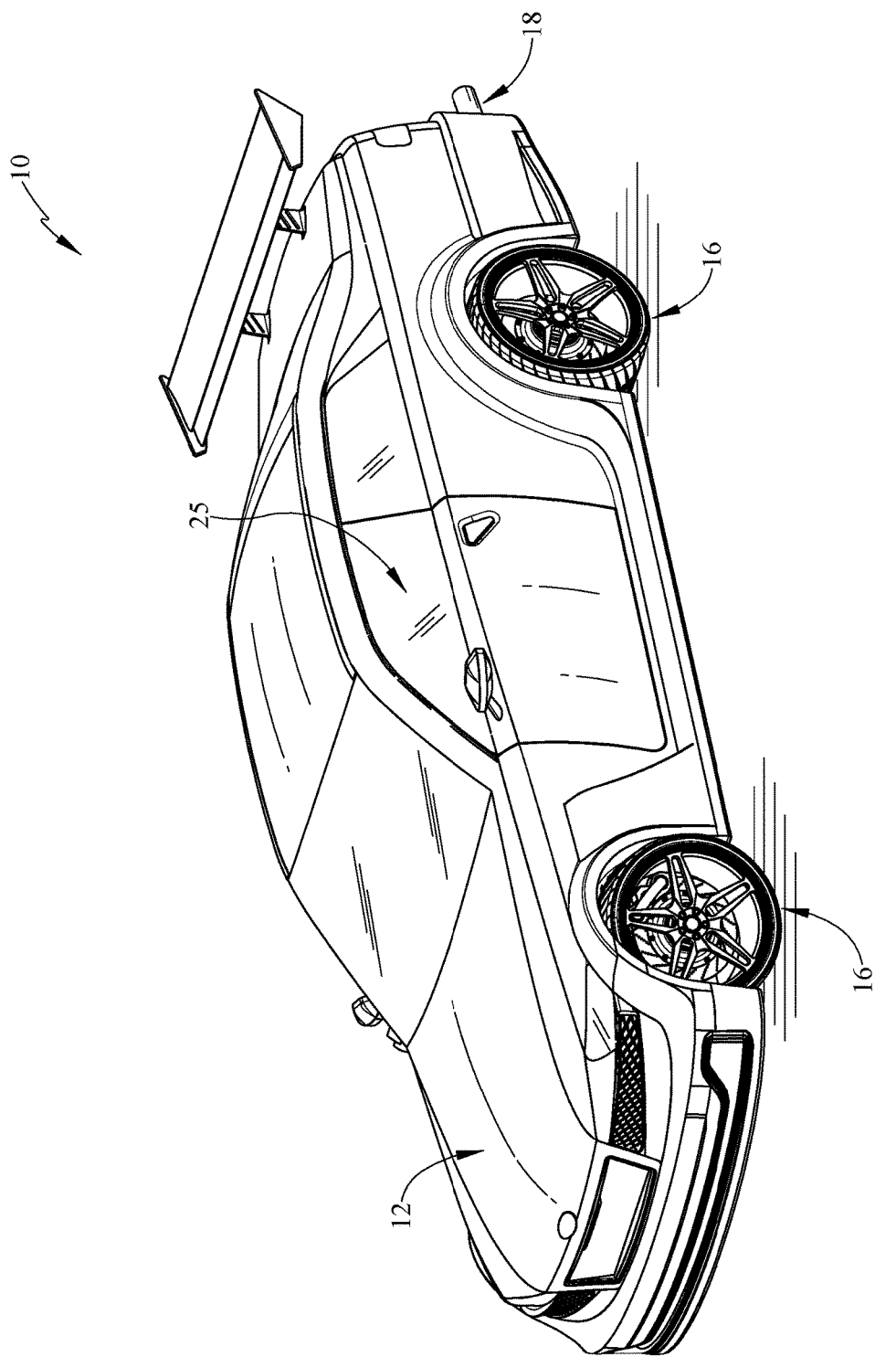
FIG. 1 is a perspective view of an example of a vehicle having an engine.

It is to be understood that a disruptive air flow assembly is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-6 embodiments of a disruptive air flow assembly which may be utilized on a vehicle having an engine. The disruption air flow assembly comprises a fitting having an air flow path therethrough and a valve which may open and close the air flow path fully or at some degree. The fitting is connected to a vacuum line which directs air flow into an engine and by opening and closing the valve, the vacuum to the engine is disrupted. The rate of disruption, by way of valve movement may be varied by the driver to vary the sound of the engine. The system works at a preselected speed, such as idle speed, so that the desirable engine sound may be produced at such preselected speed, for example idle, but may be selectively inoperable when the engine speed increases during driving conditions. Thus, the engine efficiency is only effective when the vehicle is idling.

Referring now to FIG. 1, a perspective view of a vehicle is shown. The vehicle 10 includes a body 12 and an engine 14 (FIG. 2) which burns a fuel and air to create mechanical power delivery to a plurality of wheel assemblies 16. The wheel assemblies 16 may include wheels and tires and the engine 14 includes a combustion path to an exhaust port 18. During operation, the engine 14 combines air and fuel and ignites the mixture to provide power to drive the vehicle 10. The engine 14 may be a gasoline engine, diesel engine or may use other fuels, such as E-85 for example, and such engines may or may not also utilize fuel additives to enhance performance including, but not limited to, nitrous or other such fuel additives. Further, hybrid vehicles which have electric propulsion as well as an engine may also utilize the disruptive airflow assembly. The vehicle 10 may also include a driver's cockpit 25 where a driver may operate the vehicle 10.

Figure 2:
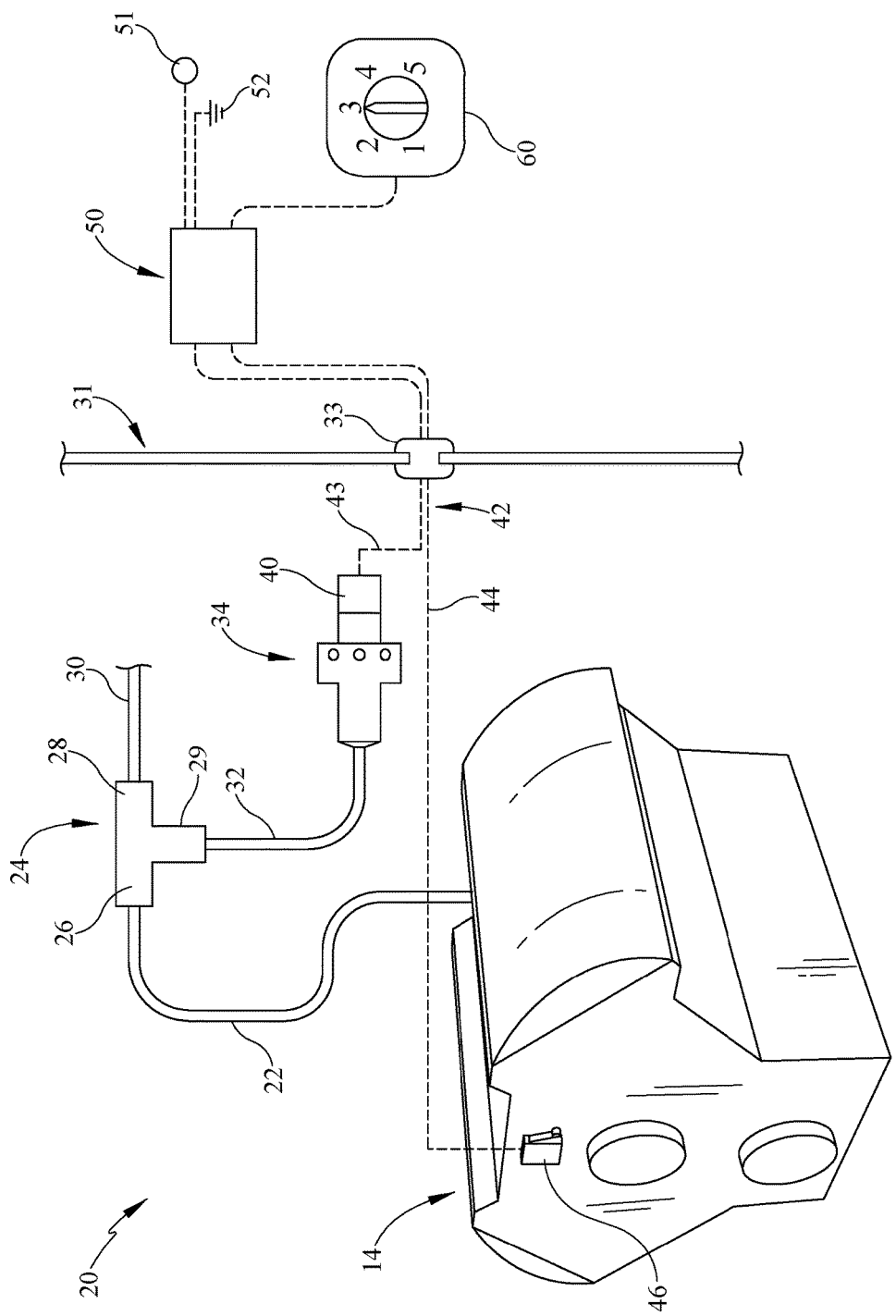
FIG. 2 is a schematic view of the mechanical and electrical components of the disruptive air flow assembly which may be utilized in a vehicle such as that shown in FIG. 1.

Referring now to FIG. 2, a schematic view of a disruptive air flow assembly 20 for a vehicle engine 14. The engine 14 converts one form of energy into mechanical energy. Heat engines, including internal combustion engines and external combustion engines (such as steam engines), burn a fuel to create heat, which then creates a force. The term engine typically describes devices, like steam engines and internal combustion engines, that burn or otherwise consume fuel to perform mechanical work by exerting a torque or linear force (usually in the form of thrust). Examples of engines which exert a torque include the familiar automobile gasoline and diesel engines, as well as turboshafts. At the lower left hand corner of the figure, the schematic engine 14 is shown. The engine 14 may be of various sizes and displacements, for example the engine 14 may be 4 cylinder, 6 cylinder, 8 cylinder or more and may have varying volume displacements based on the size of the cylinder and the total number of cylinders.

Extending from the vehicle engine 14 is a vacuum line 22 wherein a vacuum or negative air pressure is created based on the pull of air into the engine 14 for combination with combustion fuel. The engine vacuum is a pressure differential between the air pressure at the engine intake manifold and the atmospheric pressure. Combustion engines create a vacuum during operation and the vacuum aids to pull air into the engine as well as may be utilized as means to provide additional functions for the vehicle including, but not limited to, emissions control, temperature control and ignition, for example. The vacuum line 22 may be connected to any of various components to power the components and the vacuum power may be used as an alternative to electricity, which costs engine energy to create. Such energy costs results in power loss to the engine of the vehicle.

The engine vacuum line 22 is connected to a vacuum line tee 24. The tee 24 has three connections. A first connection 26 in fluid communication with the vacuum line 22. A second connection 28 in fluid communication with a second portion 30 of the engine vacuum line 22 and a third line 32 which extends from a third connection 29 to a fitting 34. The fitting 34 is provided to vary the negative pressure in the engine vacuum line 22 and therefore, vary pressure and air flow to the engine 14. The fitting 34 is operably connected to a motor 40. The motor 40 is used to move a valve between the at least first and second positions and in some embodiments, the valve may be located within the fitting 34 so as to vary pressure through the engine vacuum line 22 and flow communication with the engine 14. The depicted vacuum line 22 may be an existing line of a vehicle. The fitting 34 can be attached to any existing manifold vacuum line that is attached to the engine 14. In some embodiments, a new vacuum line can also be attached to the engine manifold and for connection of the fitting 34. Either installation may have the same desired result. The method to use depends on personal preference or ease of installation. However, for example, one may decide to install a dedicated new vacuum line for the assembly to eliminate the possibility of effecting the function of any sensitive vacuum controlled devices that are attached to any existing specific vacuum line.

The schematic view also shows a vehicle firewall 31 generally represented by parallel vertical lines and includes a pass-thru or grommet 33 through which an at least one broken line 42 extends. One of the broken lines 43 depicted provides power and/or control for the motor 40. The broken lines may represent one or more cables with one or more conductors therein. A second broken line 44 provides electrical communication with a microswitch 46. Likewise, broken line 44 may represent one or more cables with one or more conductors therein. The microswitch 46 is shown in the instant view but may alternatively be located within the cockpit 25 of the vehicle. Both of the motor 40 and the microswitch 46 provide communication between the motor 40 and the microswitch 46 with a microcontroller 50. The microcontroller 50 receives an input from a potentiometer 60 and converts the signal from the potentiometer 60 to an output which controls the speed of the motor 40. An analog dial-type potentiometer is depicted but may alternatively comprise a digital-type with display and/or buttons for adjustment. Additionally, the microcontroller 50 receives a signal from the microswitch 46 to determine when the engine 14 is at a preselected speed, for example at idle speed or when the engine is not idling so that the disruptive air assembly may be engaged or disengaged from operation.

The microcontroller 50 may include a power and ground connection 51, 52 and may be defined by the term "controller" or "microcontroller" is used herein generally to describe various apparatus relating to the monitoring of inclination sensor data and the performance of one or more actions in response to occurrence of certain inclination sensor data. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

Figure 3:
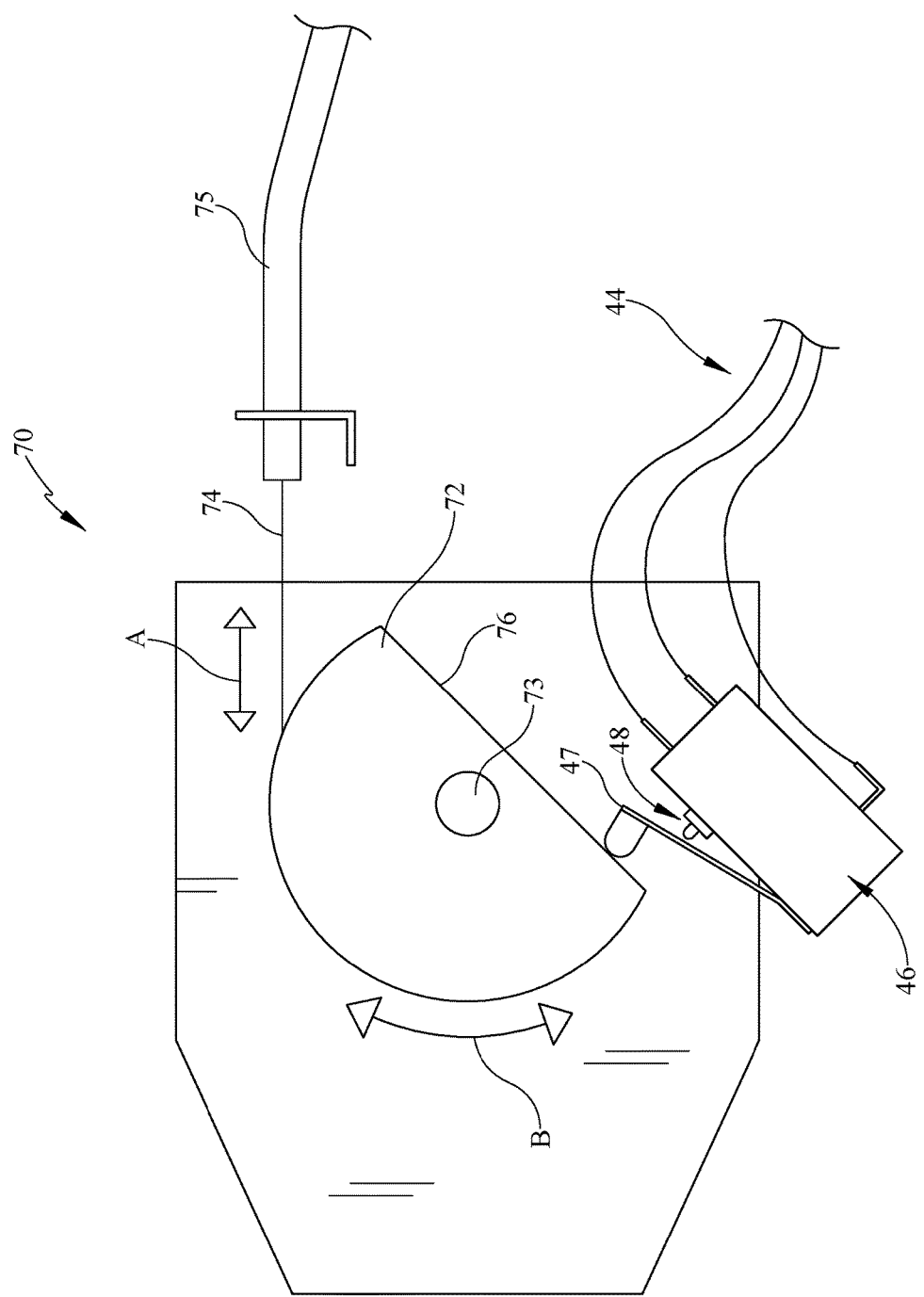
FIG. 3 is a schematic view of a throttle assembly which may be utilized with the disruptive air flow assembly of FIG. 2.

Referring now to FIG. 3, an exemplary schematic view of a throttle assembly 70 is shown. The throttle assembly 70 includes a throttle pulley 72 which rotates about a pivot 73. This structure may be located on the engine 14 as shown in FIG. 2 of the schematic view or alternatively, may be located in the driver's cockpit 25 (FIG. 1) operably connected to the pedal. This could be a mechanical-type or analog electrical connection. However, some vehicles utilize digital drive by wire throttle type assembly wherein the throttle assembly 70 may have other forms. Accordingly, the throttle assembly 70 is shown in one example embodiment, however other embodiments may be utilized as will be understood by one skilled in the art.

According to the embodiment depicted, which is non-limiting, a throttle cable 74 is connected to the throttle pulley 72 and extends through a housing 75 as the cable 74 moves with the pumping of the pedal to cause movement of the pulley 72. With movement of a gas pedal in the cockpit 25 (FIG. 1), the cable 74 moves as shown by arrow A resulting in pivoting movement B of pulley 72. Further, in the depicted embodiment, the pulley 72 is not entirely circular and has a portion 76 which is flat and engages the microswitch 46. The pulley 72 may take various shapes and be within the scope of present embodiments.

In the depicted embodiment, the microswitch 46 may include an arm 47 and a contact 48. The arm 47 may be movable between at least two positions. In one position, the throttle pulley 72 may be rotated so that the arm 47 and the contact 48 are not engaging one another. For example, this may be in a position where the engine 14 (FIG. 2) is idling and the disruptive air assembly may operate. Alternatively, in some positions, the throttle pulley 72 may be rotated so that the arm 47 is forced into the contact 48 to close the connection and in such position, the air flow disruptor may be deactivated from operation. Again, this structure is merely one embodiment and alternate throttle assemblies may be utilized with a switch or with other features to provide an on/off function for the disruptive air assembly. In alternate embodiments, a digital or analog electrical signal may be generated when the pedal is depressed. Such signal may be sent to the microcontroller 50 via cable 44 and the one or more conductors therein.

Figure 4:
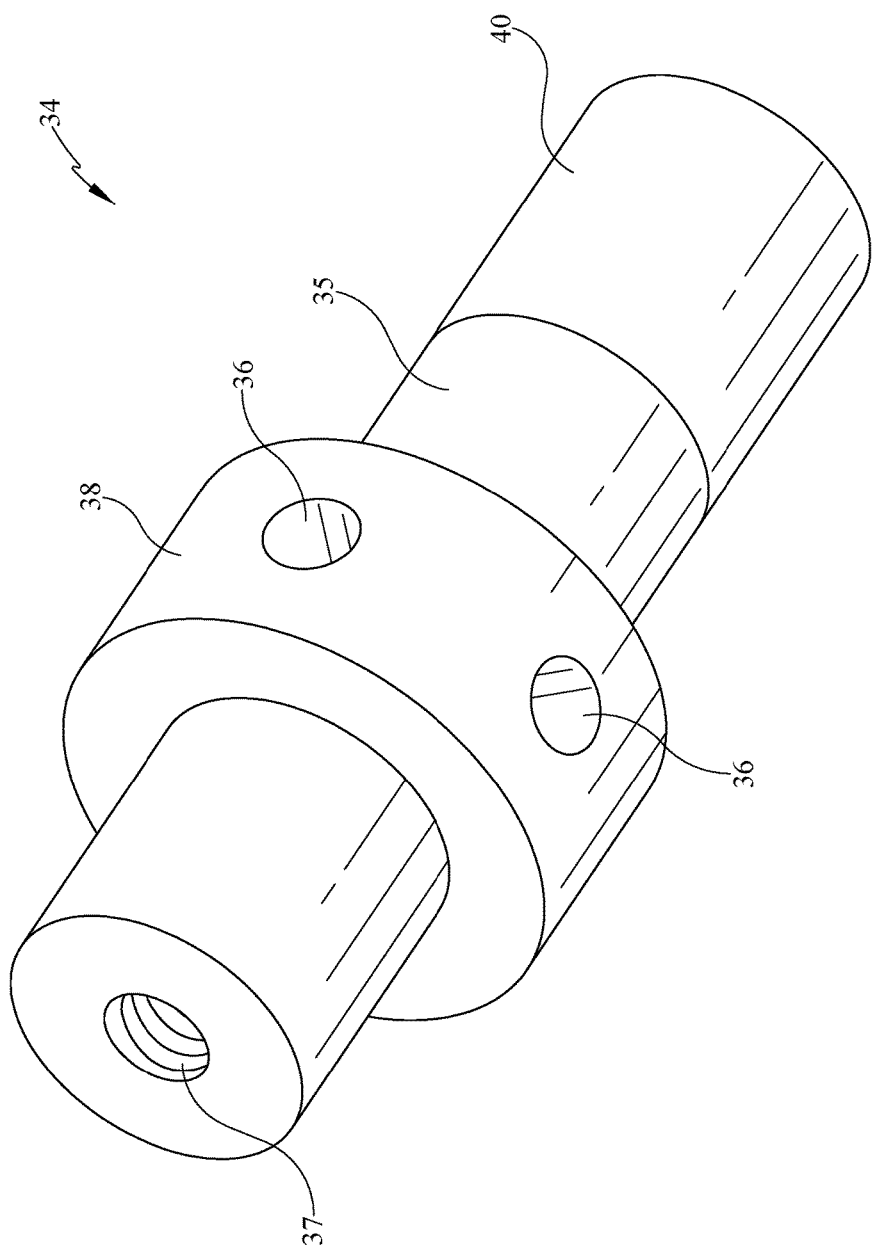
FIG. 4 is a perspective view of an exemplary vacuum line fitting.

Referring now to FIG. 4, the fitting 34 is depicted in a perspective view. The fitting 34 generally includes a valve housing 35 and at least one inlet 36 through which air flow can pass into the fitting 34 and through an outlet 37. In the instant embodiment, a plurality of inlets 36 are spaced about the fitting 34 and formed by a plurality of apertures. The inlets 36 are generally similar in shape but may also be formed of other shapes. Also, in the exemplary embodiment the fitting 34 is shown generally as a cylindrical shape with a collar 38 extending about the fitting 34 and through which the at least one inlet 36 extends. However, it should be clear to one skilled in the art that other shapes may be utilized and the fitting 34 will have at least one inlet 36 through which air flow can pass to an outlet 37.

Further, there is shown at the outlet 37 at least one thread for making a fluid or fluid connection with the third line 32 (FIG. 2). This provides air flow communication between the fitting 34, the vacuum line 22 (FIG. 2), and the second vacuum line portion 30 (FIG. 2). Other types of connections may be made and may be permanent or disconnectable including, but not limited to, quick-disconnect type connections which may or may not include threaded connections.

The valve housing 35 is disposed adjacent to the motor 40 and the valve housing 35 has a valve therein which is moveable through at least a first position and a second position to either allow or preclude air flow moving from the inlet 36 to the outlet 37. The motor 40 is operably connected to the valve within the housing 35 to move the valve between the first and second positions and therefore control position, distance of movement and/or the rate of the valve movement and therefore control various characteristics of the air flow moving from the inlet 36 to the outlet 37.

Figure 5:
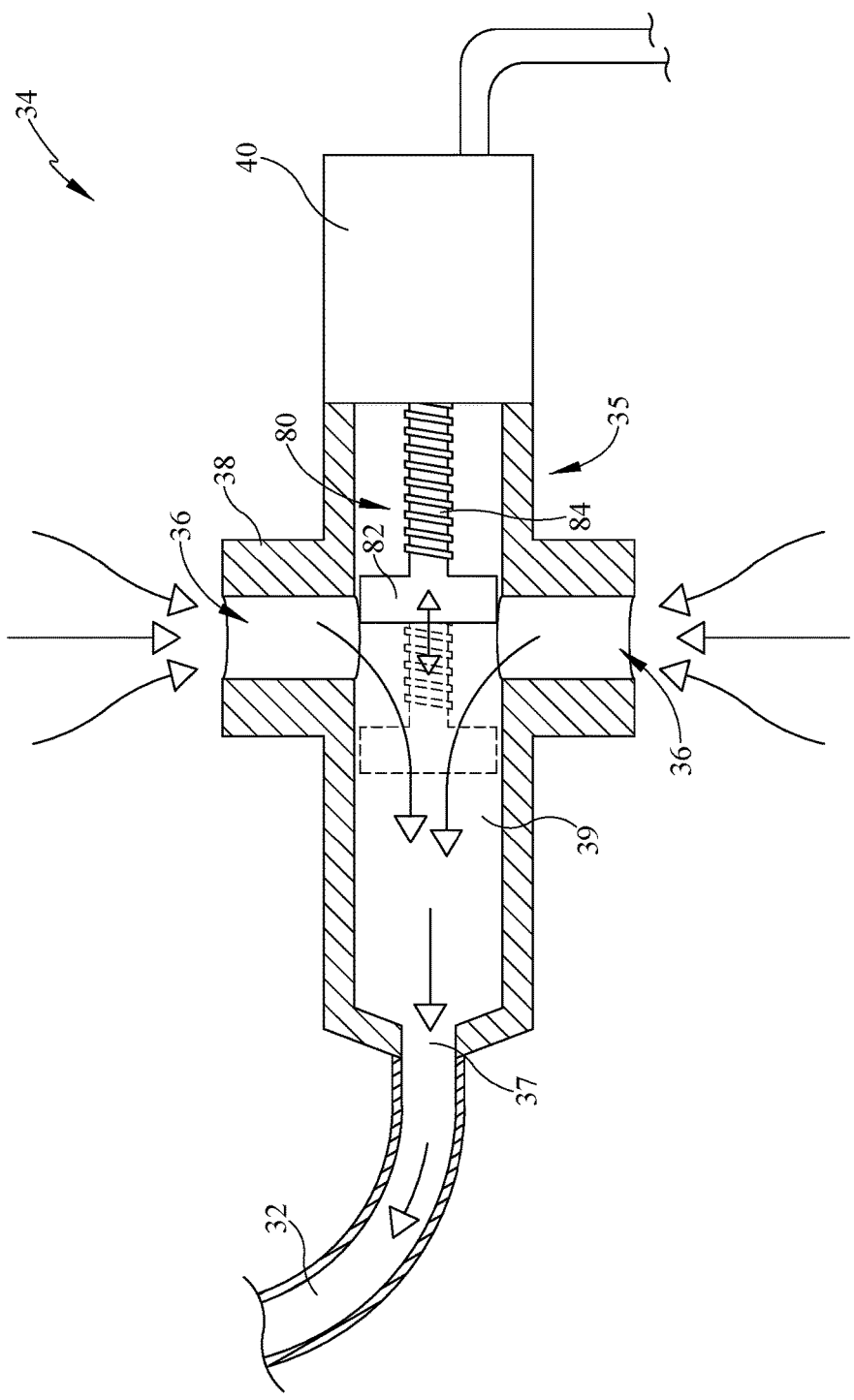
FIG. 5 is a schematic view of the exemplary vacuum fitting with a schematic motor shown; and, FIG. 6 is an electrical schematic of a portion of the disruptive air flow assembly.

Referring now to FIG. 5, a schematic section view of the fitting 34 is shown. With the fitting sectioned, additional features may be seen in this view. The fitting 34 may comprise a collar 38 and at least one inlet 36. In the exemplary embodiment the at least one inlet 36 is embodied by multiple inlets disposed about the collar 38. However, in other embodiments, the collar 38 may not be utilized and instead, the at least one inlet 36 may be disposed in alternate configuration. The inlets 36 may be positioned so that the valve 80 therein can control air flow through the inlets 36 or to the outlet 37. Also shown by the section view is the flow path 39 extending between the inlet 36 and the outlet 37. The flow path 39 moves air through the inlet 36 when the valve 80 is in an open position. This is generally depicted in solid line. Alternatively, the valve 80 is shown in broken line in a closed position so that air flow cannot move through the inlet 36 to the outlet 37.

The valve 80 may comprise a head 82 and a threaded arm 84 in order to reciprocate back and forth. The motor 40 is operably connected to the valve 80 wherein the motor 40 rotates to cause movement of the valve 80 between the first and second positions. The operable connection of the motor 40 and the valve 80 may be a direct connection or an indirect connection. The potentiometer 60 (FIG. 2) may be adjusted in the driver cockpit 25 (FIG. 1) to vary the speed in which the motor 40 operates and thereby controls the speed of the valve 80 opening and closing. When the potentiometer 60 is varied and the speed of the valve 80 changes, the sound of the engine 14 (FIG. 1) may be varied due to the change in vacuum pressure within the vacuum line 22 (FIG. 2). Alternatively, the potentiometer 60 may be used to adjust the rotational travel of the motor and therefore the linear distance moved by the valve 80. Thus the valve 80 may move to a specific position to control the amount of air flow rather than continuously reciprocating.

According to some alternatives, the potentiometer may be a rotary switch or an array of buttons that may be used. The array may provide that each button or a combination of buttons would correspond to preselected or preset function for the motor 40. In other embodiments, the analog nature of these embodiments or the potentiometer may be substituted for a digital device, or by way of addition of an analog to digital converted, which may provide input to the microcontroller 50. All of these embodiments, including alternatives, are non-limiting and are referred to collectively as potentiometers.

According to further alternatives for the valve, the other valve types may be utilized including, but not limited to, a slide valve of other valve types which may function with the rotary motion of the motor 40 or with linear motion of a solenoid or other actuating mechanisms.

The motor 40 rotates and may be connected to the valve arm 84 such that rotation of the motor 40 causes a threaded connection with the valve arm 84 to move the valve 80 between first and second positions. According to other embodiments, the motor 40 may be replaced by solenoid, and optionally a spring biasing arrangement, for example. As an alternative to the motor 40, a solenoid may be utilized with a spring biased valve so that the solenoid either opens or closes the valve depending on a signal from the microcontroller 50 and a spring or other biasing structure causes movement of the valve to a first position or a second position. Alternatively, the solenoid arrangement may merely move the valve between two positions both of which are open but allow differing amount of air flow through the valve. Thus actuation of the valve may cause movement one way and the actuation of the valve by a solenoid may cause movement of the valve in one direction and a spring may normally bias to a second position. The solenoid and motor, as well as other movement inducing features are referred to as actuators.

Figure 6:
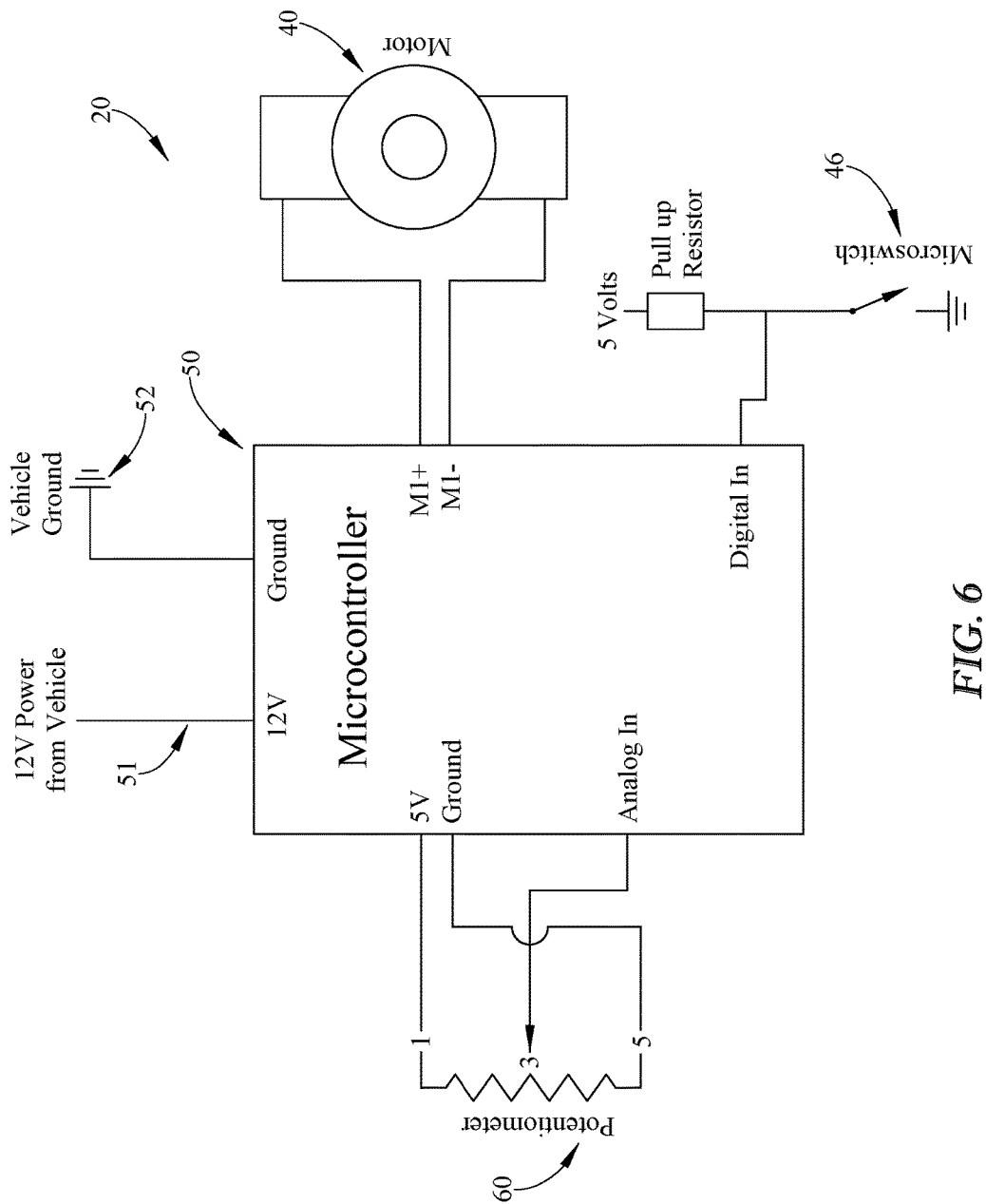

Referring now to FIG. 6, a schematic view of the electrical components of the disruptive air assembly 20 is depicted. On the left hand side of the figure is a potentiometer 60 which is a dial structure mounted in the driver cockpit 25 (FIG. 1) and which allows the driver to set a value of resistance and thereby effect the speed of motor 40, and in turn the speed of the movement of valve 80 or alternatively, control the amount of travel of the valve 80. The potentiometer 60 provides an input to the microcontroller 50. Further, the microcontroller 50 is shown with a line 51 from the power source, such as a 12V battery supply, the power from an alternator, or both, and a line 52 to a vehicle ground. Further in electrical communication with the microcontroller 50 is the motor 40, for example a stepper motor. The motor 40 drives the valve 80 (FIG. 5) movement and is controlled by the microcontroller 50. Finally, the microswitch 46 is also shown in electrical communication with the microcontroller 50. When the microswitch 46 is in a first position, such as an open position, the microcontroller 50 may determine that the engine 40 is at an idle speed, for example, and therefore allow for operation of the air disruptive assembly 20 (FIG. 2), for example by way of movement of the valve to a preselected position or continuous movement at a desired rate. Alternatively, when the microswitch 46 is closed, it may be desirable that the air disruptive assembly 20 is inoperable so that the valve 80 is in a closed position in fitting 34 (FIG. 5) and so that the vacuum pressure is consistent with normal operating conditions and engine 14 efficiency is maximized. In such way, the motor 40 may move the valve 80 to a preselected position, such as the closed position, for example. Alternate assemblies may be utilized depending on when the disruptive assembly is desired for use and when operation is desired to be inoperable, according to some embodiments. Further, other open/closed relationships as well as other engine speeds may be utilized.

In operation, a vehicle 10 may be started and when at idle speed, the potentiometer 60 may be adjusted in the driver cockpit 25 to communicate with the microcontroller 50 and vary the rate of movement of the motor 40. The motor 40 may cause valve movement at a predetermined rate or to a specific position based on the potentiometer setting. As a result, the valve 80 opens and closes the air flow path 39 (FIG. 5) between the inlet 36 and the outlet 37 of the fitting 34. This varies the amount of vacuum in the engine vacuum line 22 (FIG. 2) and the vacuum line second portion 30 (FIG. 2). Further, this provides the engine 14 with a desired sound, or the potentiometer 60 can be varied to reach a desired sound. When the driver gives the engine 14 more gas by pressing an accelerating pedal, the engine speed may increase and the microswitch 46 is engaged or disengaged, depending upon its initial position, so that in one of the two positions, the disruptive air assembly 20 is disengaged and the valve 80 remains in a closed position. When this occurs, the vacuum pressure in the line 22 and second portion 30 may build to normal levels and the engine 14 may operate normally. Alternatively, when the engine speed returns to an idle amount, the microswitch 46 may be engaged or disengaged, whichever the case may be, so that the motor 40 begins to move the valve 80 again and the potentiometer 60 may be adjusted to vary the valve movement rate and therefore affect the sound of the engine 14.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A disruptive air flow assembly for a vehicle engine, comprising:
   a vacuum line fitting having a valve, said vacuum line fitting having a fluid connection and at least one aperture extending through said vacuum line fitting and to said fluid connection;
   an inlet formed at said aperture and an outlet formed at said fluid connection defining a flow path through said vacuum line fitting;
   a motor operably connected to said valve to move said valve and vary air flow in said flow path;
   a processor in electrical communication with a potentiometer, said processor further in electrical communication with said motor; and, wherein said potentiometer may be adjusted to vary a speed of said motor and vary a speed of said valve to disrupt air flow passing through said vacuum line fitting.

2. The disruptive air flow assembly of claim 1, said at least one aperture being multiple apertures spaced about said fitting.

3. The disruptive air flow assembly of claim 2, said valve allowing, stopping and varying air flow through said apertures.

4. The disruptive air flow assembly of claim 1, said processor being a microprocessor.

5. The disruptive air flow assembly of claim 1, further comprising a switch in communication with said processor.

6. The disruptive air flow assembly of claim 5, said switch one of inhibiting or allowing operation of said motor.

7. The disruptive air flow assembly of claim 1, further comprising a switch capable of being connected to a throttle.

8. A method of changing engine sound, comprising the steps of:
bringing an engine to idle speed;
moving a motor in electrical communication with a potentiometer and a power source;
moving a valve by said motor to actuate between a first and second position;
allowing air flow to pass through an aperture in a vacuum line fitting when said valve is in an open position; and,
vary a sound of said engine by adjusting said potentiometer.

9. The method of disrupting air flow to a vehicle engine of claim 8, further comprising adjusting said potentiometer to a desired motor speed.

10. The method of disrupting air flow to a vehicle engine of claim 9, said motor speed changing the rate of valve movement.

11. The method of disrupting air flow to a vehicle engine of claim 8, further comprising disengaging said motor when said engine speed raises above idle.

12. The method of disrupting air flow to a vehicle engine of claim 11, further comprising actuating a switch to disengage said motor from operating.

13. The method of disrupting air flow to a vehicle engine of claim 12, further comprising actuating said switch with movement of a throttle component.

14. A vehicle with a disruptive air flow assembly, comprising:
an engine which mixes air and fuel to produce a mechanical work;
a vacuum line fitting in air flow communication with said engine, said vacuum line fitting having a location for vacuum line connection and at least one hole disposed into said fitting;
an inlet formed by said at least one hole and an outlet formed at said vacuum line connection defining a flow path through said vacuum line fitting;
a valve disposed in said fitting and movable between a first position and a second position wherein said at least one hole is one of open or closed at one of said first position or said second position to air flow through said fitting;
a processor which receives input from a potentiometer in electrical communication with said processor; and,
an actuator in electrical communication with said processor, said actuator operably engaging said valve to move said valve between said first and second positions based upon an input from said potentiometer.

15. The vehicle with said disruptive air flow assembly of claim 14, further comprising a switch in operable communication with said engine to one of operate or preclude operation of said disruptive air flow assembly.

16. The vehicle with said disruptive air flow assembly of claim 15, said switch operably connected to a throttle.

17. The vehicle with said disruptive air flow assembly of claim 14, said potentiometer disposed in an interior of said vehicle.

18. The vehicle with said disruptive air flow assembly of claim 14, said actuator being one of a motor or a solenoid.

19. The vehicle with said disruptive air flow assembly of claim 14 potentiometer being one of analog or digital.

* * * * *